(12) United States Patent
Lefévre et al.

(10) Patent No.: US 6,580,917 B1
(45) Date of Patent: Jun. 17, 2003

(54) MOBILE STATION FOR USE IN MOBILE RADIO SYSTEMS

(75) Inventors: Pascal Lefévre, München (DE); Karsten Rudolph, Ingolstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/424,757

(22) PCT Filed: Apr. 28, 1998

(86) PCT No.: PCT/DE98/01175

§ 371 (c)(1),
(2), (4) Date: Nov. 29, 1999

(87) PCT Pub. No.: WO98/54846

PCT Pub. Date: Dec. 3, 1998

(30) Foreign Application Priority Data

May 27, 1997 (DE) .......................................... 197 22 179

(51) Int. Cl.⁷ .................................................. H04Q 7/20
(52) U.S. Cl. ........................ 455/466; 455/566; 455/575
(58) Field of Search ................................ 455/466, 412, 455/566, 575; 707/531, 532, 533, 534

(56) References Cited

U.S. PATENT DOCUMENTS

| | | | | |
|---|---|---|---|---|
| 6,205,342 B1 | * | 3/2001 | Oakes et al. ................ | 455/566 |
| 6,259,934 B1 | * | 7/2001 | Guerlin ....................... | 455/566 |
| 6,278,886 B1 | * | 8/2001 | Hwang ........................ | 455/556 |
| 6,473,621 B1 | * | 10/2002 | Heie ........................... | 455/466 |

FOREIGN PATENT DOCUMENTS

| | | | | |
|---|---|---|---|---|
| EP | 693860 A2 | * | 1/1996 | ............ H04Q/7/32 |
| EP | 0 693 860 A2 | | 1/1996 | ................ 455/466 |

* cited by examiner

Primary Examiner—Thanh Cong Le
Assistant Examiner—Tuan Tran
(74) Attorney, Agent, or Firm—Bell, Boyd & Lloyd LLC

(57) ABSTRACT

A mobile station for the transmission of communication information.

The communication information transmitted by the mobile station also includes text information so that it is possible to transmit specific text messages to a base station or to a desired receiver. In order to facilitate the production of the text messages to be transmitted, a number of text messages are predetermined, in which case the predetermined text messages also can be changed, at least partially, and added to. The predetermined text messages are stored in an appropriate memory in the mobile station.

22 Claims, 3 Drawing Sheets

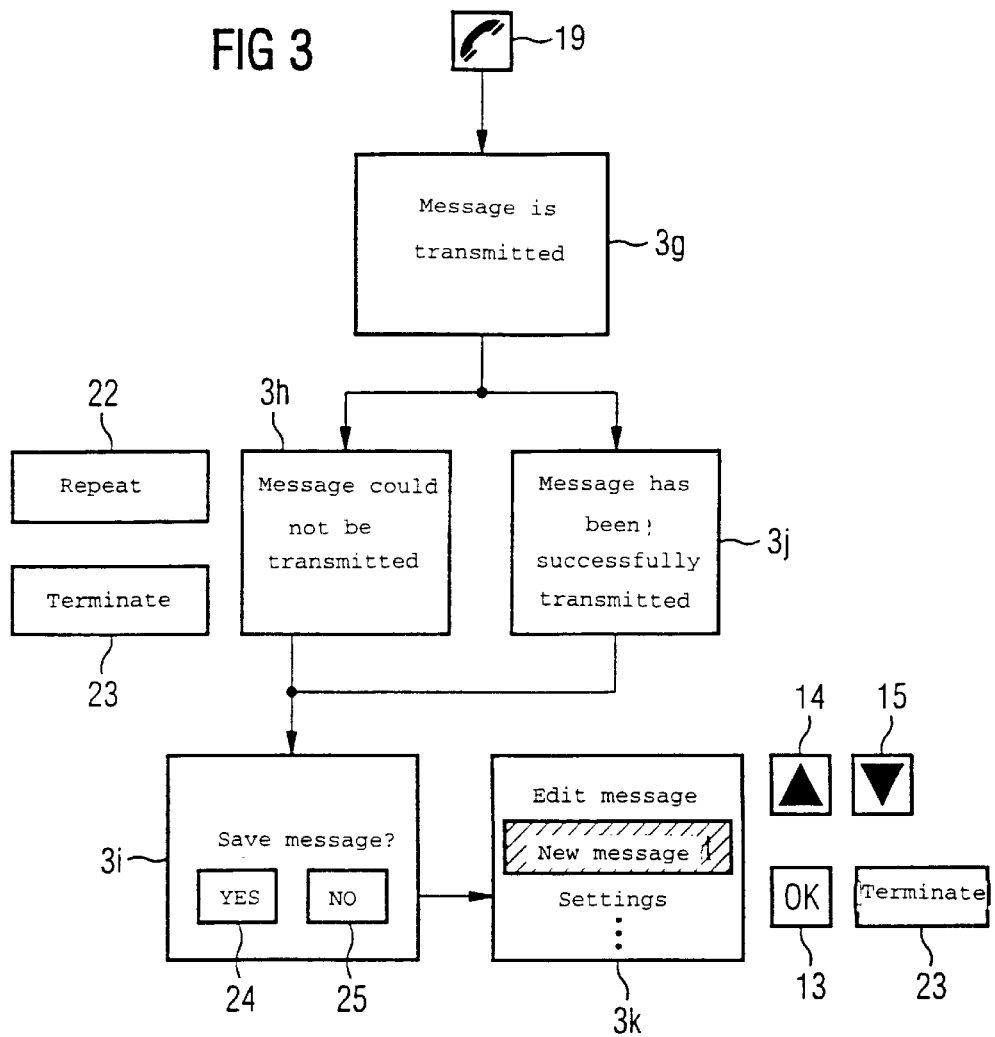

MOBILE STATION FOR USE IN MOBILE RADIO SYSTEMS

BACKGROUND OF THE INVENTION

1. Field of the Invention

The present invention relates, generally, to a mobile station for use in mobile radio systems and, move particularly, to mobile telephones through which it is possible to transmit not only voice information but also text messages.

2. Description of the Prior Art

Mobile communication is one of the fastest growing segments in the futuristic, high-growth field of telecommunications. Various mobile radio systems and communication standards are already known. The so-called GSM mobile radio system (Global System for Mobile Communication) has been in use in Western Europe since 1992 and, since then, also has been introduced in a large number of countries outside Western Europe. The DCS-1800 mobile radio system (Digital Cellular System) is also known and is virtually identical to the GSM mobile radio system, except for the frequency band. Other known mobile radio systems and communication standards include the American D-AMPS mobile radio standard (Digital Advanced Mobile Phone System), which is also called IS-54 (Interim Standard 54). IS-95 mobile radio system is also currently used in the USA. The JDC mobile radio standard (Japanese Digital Cellular) is known in Japan and is also called PDC mobile radio standard (Personal Digital Cellular).

The known mobile radio systems and communication standards described above differ not only in the frequency band used but also in terms of other major technical parameters; such as the channel separation, the multiplexing method, the modulation method or the number of channels which can be transmitted per carrier frequency.

As a rule, mobile radio systems are of cellular design; that is, the overall area to be supplied is subdivided into relatively small radio zones, so-called radio cells, in which case each radio cell is assigned a base station whose reception area is limited to the corresponding radio cell. Thus, within a radio cell, a mobile terminal always communicates only with the base station responsible for that radio cell. If a mobile terminal moves out of the supply area of its base station, the connection has been routed via a different base station. This is done by automatically changing the radio zone without any significant disturbing influence on the quality of the call in progress. This process is called "handover".

In addition to the actual telephone service, that is to say the transmission of voice information, a number of mobile radio systems also offer additional services such as short message services, the transmission of teletext information, or the transmission of fax information.

The present invention now relates to mobile stations which are able to transmit the short messages mentioned above. With appropriately equipped mobile telephones, the user can, thus, compose a short text message and send it to a desired recipient. The text message may be stored in the mobile telephone itself; or on a smart card, for example, the SIM smart card (Subscriber Identity Module).

Within the GSM mobile radio system, this short message service is called the SMS. SMS is a new service, specifically for mobile radios, which has been introduced with the GSM. In this case, a mobile station can send text messages, such as traffic information, not only to an individual recipient but also to a number of receiver stations. According to the SMS Standard, the text messages to be transmitted may include up to 160 alphanumeric codes, in which case each character can be stored coded and packed by means of a 7-bit ASCII code.

The text messages are input via the keypad on the mobile telephone. Since a large number of individual alphanumeric characters have to be input and, as a rule, each key on the mobile telephone has multiple functions for inputting letters and numbers, the process of inputting a text message is complicated, tedious and not very user-friendly. If, for example, the number "1" is provided on a key in the fourth place after the letters "ABC", then, before inputting the number "1", the appropriate function must be selected by operating this key several times. The process of inputting a long number, for example a telephone number, in a text message to be transmitted is thus, in particular, very onerous for the user.

EP 0 693 860 has already disclosed an SMS system which contains SMS messages which have been prepared in advance and which can be expanded by user-defined inputs. Embodiments of the invention described in the document are concerned with the conversion of these messages into other languages a in particular, languages having alphabetic characters which differ from latin alphabetic characters, such as Greek or Cyrillic characters.

The present invention is, thus, based on the object of refining a mobile station so as to make it easier for a user to transmit text information and text messages using the mobile station.

SUMMARY OF THE INVENTION

The mobile station according to the present invention has memory means for the storage of predetermined text information which includes at least one text field which cannot be changed by the user. This predetermined text information may include a number of predetermined text messages, which can be selected by a user as required. In the simplest case, the user merely has to select one of the predetermined text messages, without any need for the user to make any additional text inputs.

The present invention is, accordingly, not just limited to mobile telephones, but also can be used on mobile stations which can only transmit text information and/or can only transmit (and cannot also receive) communication information.

According, to a preferred embodiment of the present invention, however, the predetermined text information includes a plurality of text records or text messages in which each text message includes a number of text fields which cannot be changed by a user as well as a number of input fields which can be changed, as required, by the user. The user can use the keypad on the mobile station to add to a predetermined text message, as required, by inserting alphanumeric characters into a user variable input field in the appropriate text message.

The mobile station display allows the user to continuously monitor the selection of the text messages as well as the insertion of the alphanumeric text characters.

After selection of a predetermined text message, the user can operate appropriate keys on the mobile station keypad to change between the individual Muser variable input fields wherein the current insertion position preferably is shown on the display by means of a flashing cursor.

The predetermined text information stored in the memory means thus includes predefined text modules which a user merely has to add to. As such, the user need enter only a small amount of text which makes it considerably easier for the user to transmit and input text information.

A user variable input field in a selected text message may be either empty or already filled with predetermined characters. This can be accepted or overwritten by the user. An input field also may have the length 0 such that the input field displays only an insertion mark at the point where a user can input any desired text. The input fields may be of variable length and can be enlarged as required. However, since, for example in the case of the GSM mobile radio system, the maximum, length of a text message to be transmitted includes 160 characters, the present invention proposes that the instantaneous overall length of the text which is changed by the user should be monitored using an appropriate control device and that, if the maximum length is exceeded, any test characters that have been input in addition are rejected, or that lengthening of the text message is suppressed. In general, when an input field is enlarged, the subsequent text, that is to say the subsequent, fixed text fields as well as the subsequent user variable input fields, are shifted to the rear, or to the right.

According to preferred embodiment of the present invention, the individual user variable input fields are assigned specific predetermined field types so that only characters corresponding to the field type can be input into each input field in the format appropriate to the field type. Thus, for example, one input field may allow only numbers to be input while another may allow only letters to be input. Furthermore, in the former case, it is possible for one input field to allow numbers to be entered only in a data format or in a time format. The mobile station advantageously has a control device which uses the positioning of cursor in an input field to automatically identify the field type assigned to this input field and, when the mobile station keypad has multiple functions, to automatically activate that function which corresponds to the format of the corresponding field type. If, for example, one field type in an input field allows only numbers to be input, then the control device automatically activates that key function on the mobile station keypad which can be used to input numbers. This, on the one hand, automatically prevents letters from being input and, on the other hand, makes it easier to input numbers since the user does not need to operate the appropriate key several times.

The user also has the option, of course, of presetting and storing new text information and text messages himself. Information relating to any predetermined text message is, in this case, stored together with the predetermined text information which defines the number of user variable input fields, the position of the user variable input fields in the predetermined text message, the length of the user variable input fields and the type of individual input fields in the predetermined text message. This information is stored with each predetermined text message in the form of a "header". The header, thus, includes all the necessary information relating to the user variable input fields and, therefore, represents a suitable format for storing the predetermined text messages in a data memory having a small memory volume. As such, the greatest possible flexibility is ensured. The administration of the input fields in the header allows the input fields to be found easily.

After selection of a predetermined text message or of a predetermined text record, the selected text message is shown on the display, preferably with the user variable input fields being marked and highlighted by displaying appropriate spacekeepers. In the same way, it is also possible to mark only the start and end of an input field by specific characters.

Although the present invention is not limited to this, the mobile station in the present invention is advantageously used in the form of a mobile telephone which can not only send, but also receive, text information and which, in addition, is suitable for the transmission of voice information.

Additional features and advantages of the present invention are described in, and will be apparent from, the Detailed Description of the Preferred Embodiments and the Drawing.

DESCRIPTION OF THE DRAWING

FIGS. 2 and 3 show illustrations to explain the selection and the process of inputting text information to be transmitted, using the exemplary embodiment shown in FIG. 1.

DETAILED DESCRIPTION OF THE PREFERRED EMBODIMENTS

Figure 1:
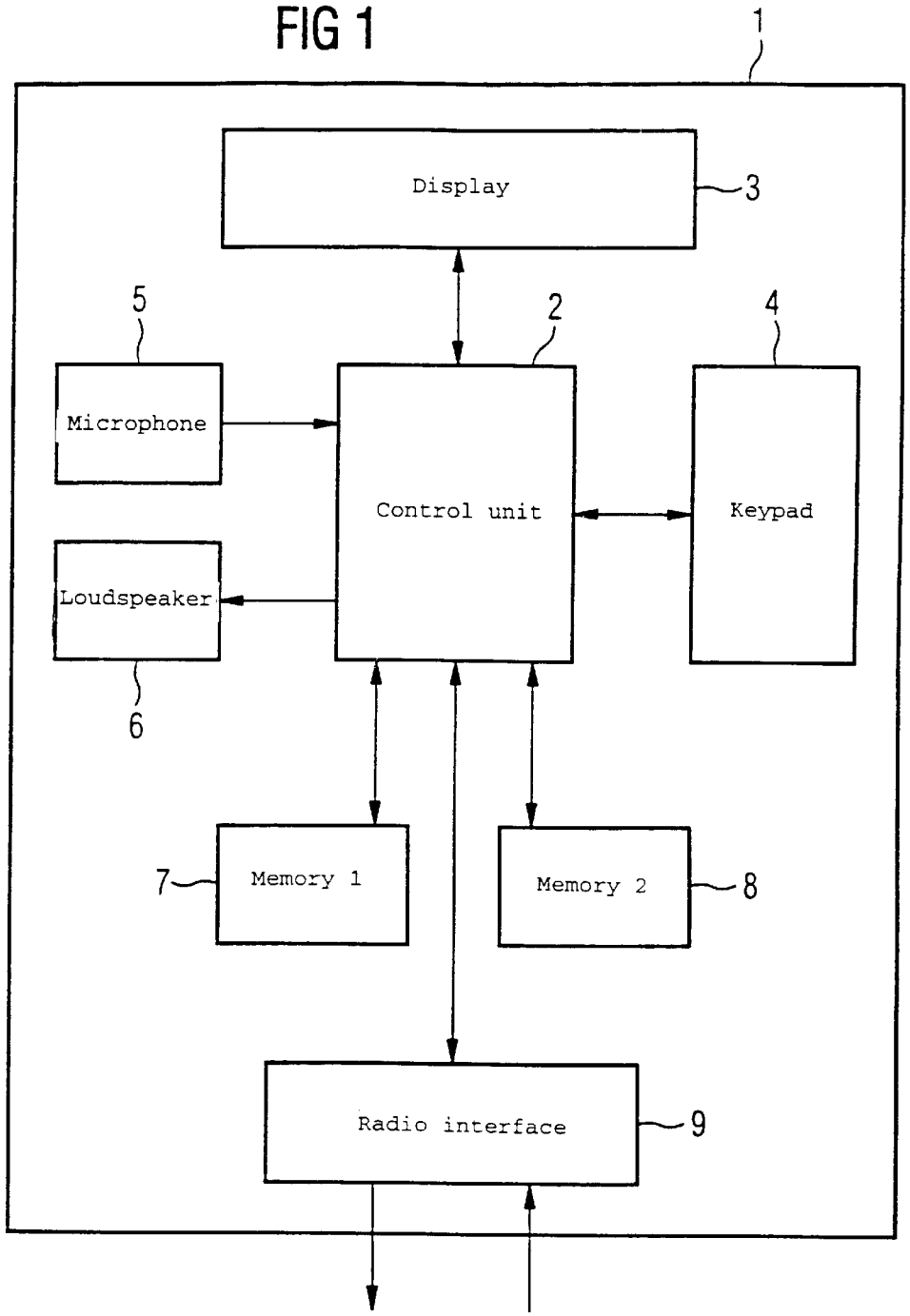
FIG. 1 shows a simplified block diagram of a preferred embodiment of a mobile station according to the present invention.

The preferred embodiment shown in FIG. 1 has a mobile telephone 1 which, in general, interchanges communication information with a base station in accordance with a specific communication standard; for example, GSM. Apart from the normal transmission of voice information, the mobile telephone shown in FIG. 1 also is suitable for the transmission of text messages; for example, in accordance with the SMS Standard within the GSM mobile radio system. The communication information transmitted and received by the mobile telephone shown in FIG. 1 may thus include not only voice but also text information. The mobile telephone 1 shown in FIG. 1 includes a first memory 7 in which a plurality of predetermined text messages or text records are stored, each of which includes at least one text field which cannot be changed by a user. In the simplest case, none of the predetermined text messages can be changed so that the user can define the text information to be transmitted simply by selecting one of the predetermined text messages.

However, the predetermined text messages stored in the memory 7 preferably each have a plurality of fixed text fields as well as a plurality of input fields which can be changed as required by the user. Each predetermined text message thus provides the user with a plurality of text modules which just need to be added to, so that only a small number of text characters need be input manually by the user.

The predetermined text messages are selected using the keypad 4 on the mobile telephone. This keypad 4 likewise is used to input text characters, by means of which the user variable input fields in the predetermined text messages can be overwritten or filled out.

After selection of one of the predetermined text messages, this message is displayed on the display 3 of the mobile telephone 1. The display 3 is preferably designed in the form of an LCD. By monitoring the display 3, the user can continuously monitor the instantaneous input position within the selected text message and can view the process of inputting text characters.

After completion of a user-specific text message, that is to say after filling out the user variable input fields in a selected, predetermined text message, the user can save the completed text message in a further memory 8 in order to call it up once again later. The memories 7 and 8 also may be formed by one and the same memory. Furthermore, the memories 7 and 8 may be provided such that they are interchangeable, for example in the form of a smart card, so that different users can operate the mobile telephone 1 shown in FIG. 1 using the respectively desired text messages. In particular, the memories 7 and/or 8 may be arranged on a user's so-called SIM card (Subscriber Identity Module). A user must insert this SIM card into the mobile telephone 1 before starting to use it, and the SIM card contains authentication data which identifies the user and is read when the user starts to use the mobile telephone 1. This authentication data is required to avoid, for example, assigning charges to the wrong subscriber.

The user also has the option, of course, of adding to the predetermined text messages saved in the memory 7 and, for example, of producing additional text messages with user variable input fields, which are likewise saved as predetermined text messages in the memory 7.

Furthermore, the user also has the option, in an analogous manner to the known prior art described initially, of not selecting any of the predetermined text messages saved in the memory 7 but, rather, of inputting and transmitting any desired complete text.

Since the exemplary embodiment shown in FIG. 1 represents a mobile telephone 1, the mobile station shown in FIG. 1 also has a microphone 5 for detecting voice information, as well as a large speaker 6 for outputting voice information. Furthermore, a central control unit 2 is provided, which coordinates and controls the components arranged in the mobile telephone and, in particular, regulates the information transmission between the display 3, the keypad 4, the microphone 5 and the loudspeaker 6, with a radio interface 9 for the mobile radio. Once the user has completed a desired text message, he can operate an appropriate key on the keypad 4 in order to report to the control unit 2 that this text message is intended to be transmitted to a specific recipient who is defined by the destination telephone number dialed by the user. The control unit 2 then transfers the text information or text data corresponding to the complete text message to the radio interface 9, and activates it. The radio interface 9, which can, for example, transmit communication data in accordance with the GSM mobile radio standard, codes and modulates the communication information to be transmitted in accordance with the technical characteristics of the GSM mobile radio station. The radio interface 9 then transmits the communication information, which (according to the present invention) also contains text information, to a base station.

Finally, the base station is responsible for passing the communication information on to the desired recipient. The radio interface 9 demodulates and decodes received communication information in accordance with the GSM mobile radio standard, and supplies the received communication information to the control unit 2. Depending on whether the received communication information is voice or text information, the radio interface 9 outputs the communication information via the loudspeaker 6, or displays it on the display 3. Received text information also can be stored, for example, in the memory 8 and/or can be output acoustically via the loudspeaker 6.

The operation of the preferred exemplary embodiment shown in FIG. 1 will be explained in more detail in the following text with reference to FIGS. 2 and 3.

Figure 2:
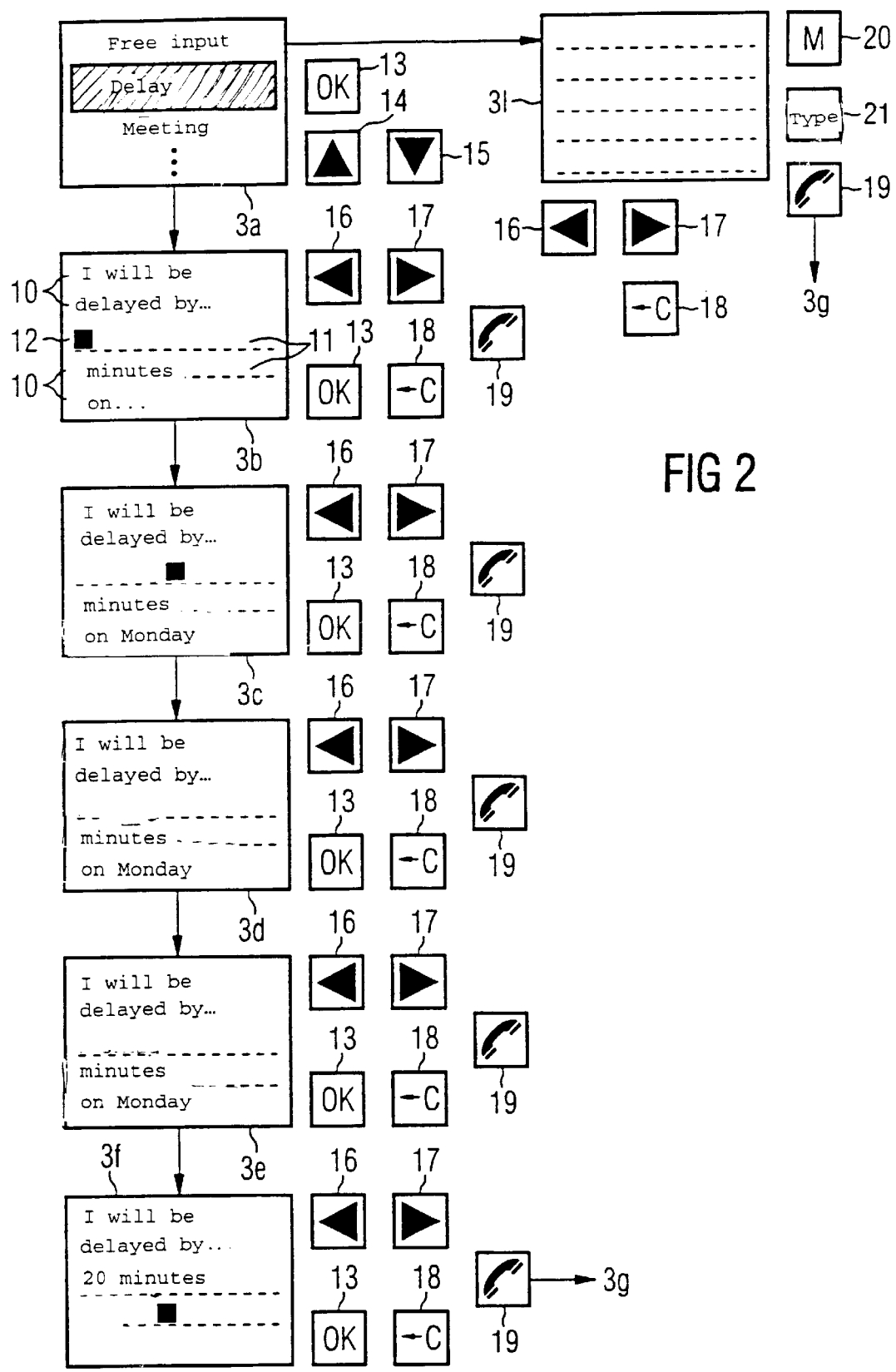

FIGS. 2 and 3 show different views and forms of the illustration of the display 3 (shown in FIG. 1) on the mobile telephone 1, which occur in the course of the selection and inputting of a text message by the user. In addition to the individual illustrations 3a–3k of the display 3, various functions which can be carried out (that is to say can be initiated) with the respective display contents 3a–3k are reproduced by showing appropriate keys. In this case, a corresponding key can be provided for each of these functions on the keypad 4 on the mobile telephone 1. As is indicated by the display contents 3i, these also may be function fields, however, which are displayed on the display 3 together with a text that is to be displayed. In this case, it is possible to use a key on the keypad 4 on the mobile telephone to change between the individual function fields, and to select the appropriate function.

FIG. 2 shows the display 3, with the display content 3a, for the situation in which a user has used the keypad 4 to report to the control unit 2 that he wishes to produce and/or send a new text message. In this case, a number of selection options are displayed on the display 3, and one of the selection options (as will be described in more detail in the following text) allows any desired text to be input without predetermined text fields ("free inputs" option). The other displayed options are, in each case, abbreviations for various predetermined text information or text messages in the memory 7, which each include a number of predetermined and fixed text fields as well as a number of input fields which can be varied, as required, in a user-specific manner. If, for example, the user wishes to report to the recipient that he has been delayed, then (as is shown in FIG. 2) he selects the predetermined text message entitled "delay". If, on the other hand, the user wishes to arrange a meeting, then he selects the predetermined text message with the title "meeting". The selection is made using the keys and function fields 14 and 15, and the selection can be confirmed by using the key 3. The respective currently selected option is shown highlighted by a bar.

In the following text, it is assumed that the user has selected the "delay" option on the display contents 3a so that the control unit 2 shown in FIG. 1 loads the appropriate predetermined text message from the memory 7 and displays this on the display 3, as is indicated by the display contents 3b.

The loaded predetermined text message displayed on the display 3 includes a number of text fields 10 which cannot be changed by the user. Furthermore, a number of input fields 11 are provided which can be changed, filled out and overwritten as required by the user. The scope of the predetermined text fields 10 is limited by the corresponding memory medium 7 and, for example in the case of the GSM mobile radio standard, can be defined for a maximum of 64 characters. The maximum overall text length after the predetermined text message has been filled out in a user-specific manner is likewise limited by the memory medium and by the basic mobile radio system. With the GSM mobile radio standard, the text message according to the SMS standard may include up to 160 characters.

Based on the display content 3b shown in FIG. 2, the user can now fill out or overwrite the predetermined input fields 11 as required. As is shown in FIG. 2, the input fields are indicated by "\_" according to the preferred embodiment. However, it is likewise also conceivable for only the start and the end of each input field 11 to be indicated by means of a specific special character. The instantaneous input position is indicated to the user by means of a flashing cursor 12. The user can now use the keys and function fields 16 to 17 to move freely within the input fields. If the cursor 12 is located at the end of an input field 11 and the user selects the function 17, then the cursor 12 automatically jumps to the next input field 11. The so-called "backspace function" 18 in each case allows the user to delete the character located to the left of the cursor 12 in an input field 11.

As an alternative to the embodiment shown in FIG. 2, an appropriate text can be predetermined completely or partially at this stage for each user at the variable input field 11. Thus, for example, a proposal for a day of the week can be predetermined at this stage for the first input field 11 shown in FIG. 2 which the user can either accept or else overwrite as required.

Furthermore, the text fields 11 may have a variable length and, thus, be enlarged as required. When, for example, the cursor 12 reaches the end of an input field 11 and further text characters are input via the keypad 4, the input field 11 is automatically lengthened and the subsequent text and input fields are shifted to the rear. Since the overall length of a text message to be transmitted is limited as a function of the memory medium, that is to say memories 7 and 8 of the mobile telephone 1 shown in FIG. 1, as well as the basic mobile radio system, the control unit 2 shown in FIG. 1 continuously monitors the instantaneous overall length of the input text message. If the overall length of the text message shown on the display 3 exceeds a specific predetermined maximum length, 160 characters in the case of the GSM mobile radio system, then the control unit 2 does not allow the corresponding input field 11 to be lengthened any more and, accordingly, either continuously overwrites the last characters of the corresponding input field or rejects any additionally input text characters.

An input field 11 of the predetermined text message also may have the length 0. In this case, the corresponding input field represents only an insertion position, that is to say a specific point in the predetermined text message at which a user can insert any required characters. This is the case as long as the overall length of the text message resulting from this does not exceed the predetermined maximum length. In contrast, the other input fields 11, which have a length greater than 0 define points within the predetermined text message at which the correspondingly predetermined input field initially must be overwritten, or filled out, before any expansion or lengthening of the corresponding input field can take place.

Each input field 11, which can be changed and expanded in a user-specific manner, is advantageously assigned a specific input field type. Thus, for example, it is possible to distinguish between a letter input field, a number input field, a date input field or a time input field. Depending on the input field type assigned to an input field 11, the control unit 2 monitors the process of filling out the corresponding input field. If, for example, an input field 11 is assigned the "letter input field" type, the control unit 2 allows only letters to be input via the keypad 4. In the case of the two input fields as shown in FIG. 2, the first input field is, for example, a letter input field and the second input field is a number input field. If an input field is assigned the "date input field" type, then all that can be input is numbers which also comply with a specific predetermined date format, etc.

As a rule, the keys of a mobile telephone have multiple functions in which case one key is assigned; in particular, a plurality of letters and one number. Thus, for example, one key can be assigned the number "9" as well as the letters "W,X,Y,Z". In order to use this key to input the letter "Z", the corresponding key must be operated five times, while it is sufficient to operate it once in order to input a "9". However, it is also possible for the situation to occur in which the corresponding key has to be operated a number of times in order to select a number. A selection key likewise be provided, using which a specific function of the mobile telephone keys can be selected and activated. Since, according to the preferred embodiment, each input field is assigned a specific input field type, it is additionally proposed that the control unit 2 monitor the input field 11 which is currently being filled out and automatically determine the type for the corresponding input field 11, depending on the current position of the cursor 12. The determination of the type for different input fields is carried out on the basis of information data which is stored together with the predetermined text information in the memory 7. In particular, it defines in more detail the individual input fields of each predetermined text message in the memory 7. This information also will be described in more detail in the following text. Once the control unit 2 has determined the type of input field 11 currently being filled out, the function of the mobile telephone key corresponding to the input field type is activated automatically, and the other functions of the keys are deactivated. If this is a number input field, the inputting of letters is automatically suppressed and the inputting of numbers is simplified. This occurs because the corresponding key may be operated only once in order to input a specific number even if the desired number normally would be selected on the corresponding key only after operating the key three or four times.

According to FIG. 2, all the input fields 11 are indicated by "_". Alternatively, the various types of input fields may be respectively indicated by different space keepers, that is to say possibly an additional special character.

In the exemplary embodiment shown in FIG. 2, the user a as is indicated by the display content 3c a—has input the desired day of the week "Monday" into the 30 first input field. By operating the "OK" function (function key 13), the cursor 12 automatically jumps to the next input field, in which case, according to FIG. 2, it is possible to input a desired number of minutes at this point. As has already been described above, a standard value once again can be predefined at this point. Once the cursor has jumped to the input field for the number of minutes (display content 3d), the user can fill out the corresponding input field as desired (display contents 3e and 3f). Once the desired number of minutes (display content 3f) has been input, the user-specific desired text message is, in principle, complete. The user can now transmit, the text message completed in this way to a desired recipient by operating or selecting the function 19. However, it is not necessary for all the predetermined input fields to be filled out for the text message to be sent. In fact, during the input process, the user can send the text message produced so far at any point after calling up a predetermined text message, by operating function 19. The function 19 is a thus available for any of the display contents 3b to 3b.

After operating the function key, or after selecting the function field 19—as shown by FIG. 3a—display 3 switches to the display contents 3g shown in FIG. 3, and reports to the user that the message produced by him is now being transmitted.

If it has been possible to transmit the message successfully, this is reported to the user (display contents 3j), and the user is then asked whether he wants to save the text message produced by him (display contents 3i). As has already been described above, the functions illustrated in FIGS. 2 and 3 can be selected by operating appropriately assigned keys on the mobile telephone keypad 4. Since, however, owing to the large number of different functions, a correspondingly large number of individual keys or corresponding multiple functions for the existing keys can be necessary, the individual functions are preferably are displayed on the display 3 in form of function fields, together with the text to be displayed. This is indicated, for example, with the aid of the selection fields 24 and 25, using display unit 3*i*. Operation of the function 24 results in the text message that has been produced being saved, and a switch being made to the display 3*k*. After operation of the function 25, the display contents 3*k* are displayed immediately.

Using the display contents 3*k*, the user can now edit the currently produced text message with, in this case, the display contents 3*f* shown in FIG. 2 being displayed, by way of example. The user likewise has the option of producing a new message, in which case the display contents 3*b* shown in FIG. 2 are called up. Furthermore, the "settings" option can be used to configure the SMS mode and to set appropriate parameters. In this case as well, the desired option is selected using the keys or function fields 14 and 15 in an analogous manner to the display content 3*a* in FIG. 2, with a selected function being confirmed and activated by the function 13. The user can terminate the menu displayed by the display 3*k* using the key or the function field 23, in which case the standard display for the mobile telephone is then called up.

If, after the display contents 3*g*, it has not been possible to successfully transmit the message produced initially by the user since, for example, an error has occurred in the transmission or the recipient was unobtainable, the display contents 3*h* are illustrated and the user is informed accordingly. The user now has the option of repeating the transmission of the text message produced by him (function 22) or, by operating the function 23, of terminating the transmission case, a change takes place to the display content 3*i* so that the user still has the option, before ending the SMS mode, of saving the text message produced by him.

User-specific text messages are generally saved by the second memory 8 shown in FIG. 1. This memory 8 may be provided separately from the memory 7 in which the predetermined text messages are stored. Alternatively, however, the two memories 7 and 8 also may be in the form of a single memory.

Finally, display contents 3*l* in FIG. 2 also will be used to explain the situation in which the user has selected the first option "free input" from the menu 3*a*. In this case, the user has the option of producing a text message completely freely, without preselecting specific fixed text fields or user variable input fields. The function of the key or function fields 16–19 corresponds to the keys or function fields described and illustrated with reference to the display contents 3*b* to 3*f*. In particular, by selecting the function 19, the user can send the text message produced by him to a specific recipient, in which case the process continues with the displays 3*g*–3*k* shown in FIG. 3.

However, in this way, the user also can produce new or additional text messages which are intended to be used later as predetermined text messages and must thus be saved in the memory 7 shown in FIG. 1. For this purpose, after selecting the "free input" option as shown in the menu 3*a*, the user can input the text which forms the text fields 10 shown on the basis of the display content 3*b*. In the meantime, the user can define the fields which act as user variable input fields 11 and in particular, can select an associated input field type by operating the key 21 or by selecting the corresponding function for each input field defined by him. Once a new original text message has been produced in this way, the function 20 can be used to save the original as a new predetermined text message in the memory 7 will, accordingly, appear in the selection menu 3*a* during subsequent transmission or production of a user-specific text message.

The memory 7 is not just used to store the text information for the individual predetermined text messages or text originals. In order to obtain the maximum level of flexibility, apart from the individual text information for a predetermined text message, information is also stored which defines the number of input fields, the position and the field length of the individual input fields as well as the type of the individual input fields. In particular, this information is stored for each predetermined text message in the form of a "header", which is followed by the actual text information (the text characters defined in the fixed text fields of the corresponding predetermined text message.) By administering the input fields for each predetermined text message in a header, the control unit 2 can display the appropriate text message, quickly and easily once it has been selected, on the display 3 with a correct position and length of the defined input fields.

The so-called header may have, for example, the following format:

Header=number_of_fields fields
number_of_fields=short_byte
fields={startpos length}
length=field_type number_of_chars
startpos=short_byte
digit='0'|'1'| . . . |'9'
short_byte=digit{digit}
number_of_chars='0'|'1' . . . |'16'
field_type=typ0|typ1 . . . |typ7

The first line of this format states that the header includes the number of input fields ("number_of_fields") as well as the information required for the fields ("fields"). This required field information includes the start position ("startpos") of the input field and the corresponding input field length ("length") (see line 3 of the format). The number of input fields ("number_of_fields") as well as the start position of the input fields ("startpos") can each be described by a number using the so-called short-byte data format (see lines 2 and 5 in conjunction with lines 6 and 7 of the above format). The input field length ("length") depends on the type of input field ("field_type"), and is defined by a specific number of characters ("number_of_chars") (see line 4 in the header format). The maximum possible number of characters per input field is limited by the last but one header format line to 16. Finally, the last line of the header format confirms that it is possible to distinguish between a total of eight different types ("typ0" . . . "typ7") of input field type ("field_type").

Input fields having a length m>0 contain the m characters following the stated start position in the text. The form thus already contains standard values which can be accepted or changed. Input fields having a length m=0 contain no text, but indicate only a position in the text at which further text can be inserted.

The format described above represents the concept for the storage and administration of text information and text messages which is optimized in terms of the memory space required and is at the same particularly flexible. Administration of the fields in the so-called header allows the input fields to be found easily and quickly.

Although the present invention has been described with reference to specific embodiments, those of skill in the art will recognize that changes may be made thereto without departing from the spirit and scope of the invention as set forth in the hereafter appended claims.

What is claimed is:

1. A mobile station for transmitting communication information to a base station, wherein the communication information includes text information, the mobile station comprising:

an input for inputting text information;

a transmission unit for transmitting the communication information; and a first memory for storing predetermined text information which includes at least one fixed test field, wherein the stored, predetermined text information at least includes information which relates to a plurality of user variable input fields, a position of the user variable input fields in the corresponding text information, and a length of the user variable input fields.

2. A mobile station for transmitting communication information to a base station as claimed in claim 1, wherein the predetermined text information comprises a plurality of predetermined text messages, each of which includes both a fixed text field and at least one of the plurality of user variable input fields, which can be changed as required by a user.

3. A mobile station for transmitting communication information to a base station as claimed in claim 2, wherein the input is used to select one of the text messages and change one of the plurality of user variable input fields in the selected text message.

4. A mobile station for transmitting communication information to a base station as claimed in claim 3, wherein the transmission unit can be activated via the input such that the text information transmitted by the transmission unit includes the selected, predetermined text message having each of the at least one fixed text field, the at least one of the plurality of user variable input fields, and text characters which may be input via the input into the at least one of the plurality of user variable input fields.

5. A mobile station for transmitting communication information to a base station as claimed in claim 3, further comprising:

a display device which shows the selected, predetermined text messages and displays both the at least one fixed text field and the at least one of the plurality of input fields, which can be changed as required by a user, after the text message has been selected.

6. A mobile station for transmitting communication information to a base station as claimed in claim 5, wherein the display device displays one of the plurality of input fields in a visually highlighted manner.

7. A mobile station for transmitting communication information to a base station as claimed in claim 5, wherein the display device displays an instantaneous input position in an input field, which can be changed as required by a user, of the selected, predetermined text message, at which input position a text character can be input using the input.

8. A mobile station for transmitting communication information to a base station as claimed in claim 3, wherein the input allows a change between the plurality of user variable input fields, which can be changed as required by a user, of the selected, predetermined text message in order to change each of the plurality of user-variable input fields.

9. A mobile station for transmitting communication information to a base station as claimed in claim 2, wherein each of the plurality of user variable input fields in each of the predetermined text messages is assigned a specific input field type.

10. A mobile station for transmitting communication information to a base station as claimed in claim 9, wherein the input field types respectively include at least one of a letter input field which allows only letters to be input, a number input field which allows only numbers to be input, a date field which allows only a date to be input, and a time field which allows only a time to be input.

11. A mobile station for transmitting communication information to a base station as claimed in claim 9, further comprising:

a keypad as part of the input, the keypad having keys with multiple functions; and a control device for automatically identifying the input field type of a user variable input field which is to be edited, and for blocking keypad functions which do not correspond to the identified input field type.

12. A mobile station for transmitting communication information to a base station as claimed in claim 9, wherein the stored, predetermined text information contains, depending on the text messages, information relating to the input field types of the user variable input fields, which can be changed as required by a user, of the respective text messages.

13. A mobile station for transmitting communication information to a base station as claimed in claim 2, wherein the at least one of a plurality of user variable input fields, which can be changed as required by a user, contains at least partially determined text characters.

14. A mobile station for transmitting communication information to a base station as claimed in claim 1, further comprising:

a second memory for storage of user-specifically-produced text information which is based on the predetermined text information.

15. A mobile station for transmitting communication information to a base station as claimed in claim 14, wherein the first memory also stores the user-specifically-produced text information.

16. A mobile station for transmitting communication information to a base station as claimed in claim 14, wherein the first and second memories are interchangeable for storage of the user-specifically-produced text information.

17. A mobile station for transmitting communication information to a base station as claimed in claim 16, wherein actual text of the predetermined text messages is arranged in the stored, predetermined text information on the basis of the information which is dependent on the text messages.

18. A mobile station for transmitting communication information to a base station as claimed in claim 1, wherein the input produces the predetermined text information in a user-specific manner.

19. A mobile station for transmitting communication information to a base station as claimed in claim 1, wherein the at least one user variable input field, which can be changed as required by a user, of the predetermined text message has a variable length.

20. A mobile station for transmitting communication information to a base station as claimed in claim 19, further comprising:

a control device for monitoring the overall length of a selected text message and suppressing the insertion of additional text characters if the overall length of the selected text message, after it has been changed using the input, exceeds a predetermined maximum length.

21. A mobile station for transmitting communication information to a base station as claimed in claim 1, wherein the at least one user variable input field, which can be changed as required by a user, of the predetermined text message is formed by an insertion mark for the insertion of user-specific text characters using the input.

22. A mobile station for transmitting communication information to a base station as claimed in claim 1, further comprising:

a receiving unit for receiving from a base station communication information which includes text information; and a reproduction unit for reproducing the text information in the received communication information.

* * * * *